United States Patent [19] [11] 3,723,065
Suryanarayana et al. [45] Mar. 27, 1973

[54] APPARATUS FOR PRODUCING CYANOGEN CHLORIDE BY SPRAY REACTION MEANS

[75] Inventors: Yelogondahally Subrananiam Suryanarayana; William Sandford Durrell, both of Mobile, Ala.

[73] Assignee: Ciba-Geigy Corporation, Ardsley, N.Y.

[22] Filed: Dec. 30, 1969

[21] Appl. No.: 1,908

Related U.S. Application Data

[62] Division of Ser. No. 622,332, March 10, 1967, Pat. No. 3,498,761.

[52] U.S. Cl. .................. 23/260, 23/263, 23/283, 423/379, 261/117, 261/152, 261/157, 261/46, 261/149
[51] Int. Cl. .............................................. C01c 3/00
[58] Field of Search ........ 23/260, 263, 359, 252, 283; 261/117, 115, 118, 152, 157, 46, 149, 148; 196/127, 128; 259/4

[56] References Cited

UNITED STATES PATENTS

| | | |
|---|---|---|
| 1,414,762 | 5/1922 | Townsend ..................... 23/260 X |
| 2,377,781 | 6/1945 | Hebbard ....................... 261/148 |
| 1,588,731 | 6/1926 | Heuser ......................... 23/359 |
| 2,775,636 | 12/1956 | Rupp ........................... 259/4 X |
| 2,701,184 | 2/1955 | Rupp ........................... 259/4 X |
| 2,524,341 | 10/1950 | Chapman et al. ............... 23/119 |
| 2,468,865 | 5/1949 | Campobasso et al. ............ 261/117 X |

*Primary Examiner*—James H. Tayman, Jr.
*Attorney*—Wenderoth, Lind & Ponack

[57] ABSTRACT

Apparatus for producing cyanogen chloride has a vaporizer in which hydrogen cyanide and chlorine are mixed to produce a gaseous mixture. A spray chamber is provided in which the gaseous mixture is dispersed, and means are provided for spraying water into the spray chamber, the amount of water being controlled so that the resulting hydrochloric acid is at a concentration of about 10 percent. If necessary to complete the reaction, a cooled reactor can be provided into which the cyanogen chloride, unreacted hydrogen cyanide vapor and chlorine are passed. The reactor should be partially flooded with hydrochloric acid at a concentration of about 10–20 percent and chlorine stripped from the hydrochloric acid produced in the spray chamber is also fed to the reaction column.

1 Claim, 2 Drawing Figures

APPARATUS FOR PRODUCING CYANOGEN CHLORIDE BY SPRAY REACTION MEANS

This application is a division of our copending application Ser. No. 622,332, filed Mar. 10, 1967, now U.S. Pat. No. 3,498,761.

BACKGROUND OF THE INVENTION

1. Field of the Invention

This invention relates to a method and apparatus for the production of cyanogen chloride, and more particularly it relates to the production of cyanogen chloride by spraying water into a gaseous mixture of hydrogen cyanide and chlorine whereby the by-product acid is at relatively high concentration.

Cyanogen chloride is a valuable intermediate for the production of cyanuric chloride, which in turn is useful as an intermediate for the manufacture of many products, such as chemotherapeutic agents, herbicides, dyes, brightening agents, synthetic resins, plastics, rubber, explosives and other materials.

2. Description of the Prior Art

A presently used commercial process of preparing cyanogen chloride for conversion into cyanuric chloride is described in U.S. Pat. No. 3,197,273 in the name of Elwood Bruce Trickey. In this process, chlorine and hydrogen cyanide are charged into the reaction section of a packed column having a purification, washing or scrubbing section, a reaction section, and a stripping section. Water is fed in at the top of the scrubbing section and steam is introduced at the base of the column at the bottom of the stripping section. By maintaining the proper rates of feed of the various materials, the temperature and conditions in the column can be maintained such that a high yield of cyanogen chloride is obtained as a gas at the top of the reactor.

The process of this patent, while it is quite satisfactory with respect to the quality and amount of the product which it is desired to produce, also produces at the bottom of the reactor column a by-product of dilute, i.e., 2-3 percent aqueous hydrochloric acid. This by-product is relatively easily disposed of when the quantity thereof is small, but in actual practice the amounts produced are so great that they cannot be disposed of simply by discharging into a stream or river without exceeding the amount which can be so discharged as established by pollution control standards. The alternative of concentrating the dilute hydrochloric acid and using it in other processes or selling it is not economically feasible, since the costs of concentrating the dilute acid are greater than purchasing concentrated acid from commercial sources.

Production of the cyanogen chloride under conditions which would produce the by-product aqueous hydrochloric acid at higher concentrations have heretofore appeared to be an unlikely solution to the problems of by-product disposal or by-product recovery, because of the twin problems of intolerable, from the commercial standpoint, losses of the product cyanogen chloride by hydrolysis and directly from the bottom of the reaction column along with the by-product hydrochloric acid. The necessity to keep hydrolysis losses low and substantially eliminate loss of cyanogen chloride are essential to the successful commercial production of cyanogen chloride. A third essential condition is the prevention of the formation of $NCl_3$, which is extremely explosive and therefore an undesired reaction product not only from the standpoint of loss of the primary product but also from the standpoint of safety.

SUMMARY OF THE INVENTION

The present invention relates to an apparatus for overcoming the problems described above and carrying out the reaction of chlorine and hydrogen cyanide to produce cyanogen chloride by feeding the two raw materials as a gaseous mixture into a spray chamber and spraying water into the spray chamber. By carefully controlling the conditions, a high rate of conversion to cyanogen chloride can be achieved at low hydrolysis losses and production of aqueous hydrochloric acid in concentrations up to about 10 percent. The reaction can be carried nearer to completion by passing the stripped bottoms from the spray chamber in countercurrent flow to the gaseous output from the spray chamber, and the bottoms from such a reaction apparatus will be near 20 percent hydrochloric acid.

BRIEF DESCRIPTION OF THE DRAWINGS

The invention will be described in connection with the accompanying drawings, in which.

DESCRIPTION OF PREFERRED EMBODIMENTS

Figure 1:
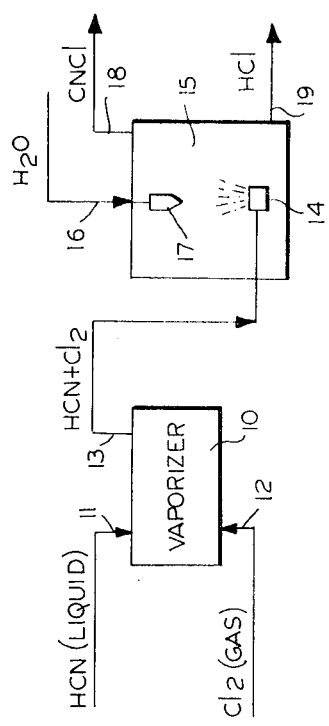
FIG. 1 is a schematic view of an experimental apparatus including a spray chamber arranged to carry out the novel steps of the method of the present invention.

As shown in FIG. 1, an experimental apparatus according to the present invention comprises a vaporizer 10 having a liquid hydrogen cyanide inlet 11 and a gaseous chlorine inlet 12. By application of external heat the liquid HCN is vaporized in the vaporizer. The outlet 13 from the vaporizer is connected to a gas dispersing head 14 in a spray chamber 15 into which extends a water inlet 16 having a spray nozzle 17 on the end thereof. Gaseous reaction products leave the spray chamber through a gas outlet 18 and liquid reaction products leave the spray chamber through the liquid outlet 19.

In operation, liquid HCN is pumped into the vaporizer 10 and gaseous chlorine at ambient temperature is pumped into the vaporizer and the HCN is vaporized and mixed with the chlorine. The resulting mixture is dispersed into the spray chamber 15 through the gas dispersing head 14 and water is sprayed into the gaseous mixture through the nozzle 17 in a spray of very fine droplets. The reaction goes nearly to completion in the spray chamber, and the gaseous cyanogen chloride mixed with unreacted HCN and chlorine passes off through the gas outlet 18 while aqueous hydrochloric acid in concentrations up to 10 percent is removed from the bottom of the spray chamber.

The amounts of chlorine, HCN and water are controlled so that the reaction produces aqueous hydrochloric acid as a by-product in concentration of about 10 percent.

A specific example will be given in order to show the manner of operating the apparatus according to the invention.

EXAMPLES 1 and 2

Liquid HCN was fed to the vaporizer, and chlorine was fed into the vaporizer at ambient temperature and in an amount sufficient to give an excess of 10 percent over that needed for complete reaction with the HCN. The resulting vapor, which was a mixture of HCN and chlorine, was dispersed into a spray chamber which was 9 inches in diameter and 18 inches high. Water was sprayed into the chamber from above in a spray of fine droplets. The amounts of HCN and water are given below in runs 1 and 2 in Table 1. The resulting gaseous product was dried and the amount of CNCl contained therein measured. The concentration of the liquid acid which remained in the bottom of the spray chamber was also measured.

TABLE I

| Run No. | Liquid HCN, gm/min. | Water, cc/min. | Equivalent HCN Solution | % HCN Conversion |
|---|---|---|---|---|
| 7 | 13 | 100 | 13% | 71.5 |
| 8 | 13 | 65 | 16.7% | 76.4 |

As can be seen from the Table, the conversion rates for the two runs were in the neighborhood of 75 percent, and the concentration of the acid was found to be near 10 percent.

Figure 2:
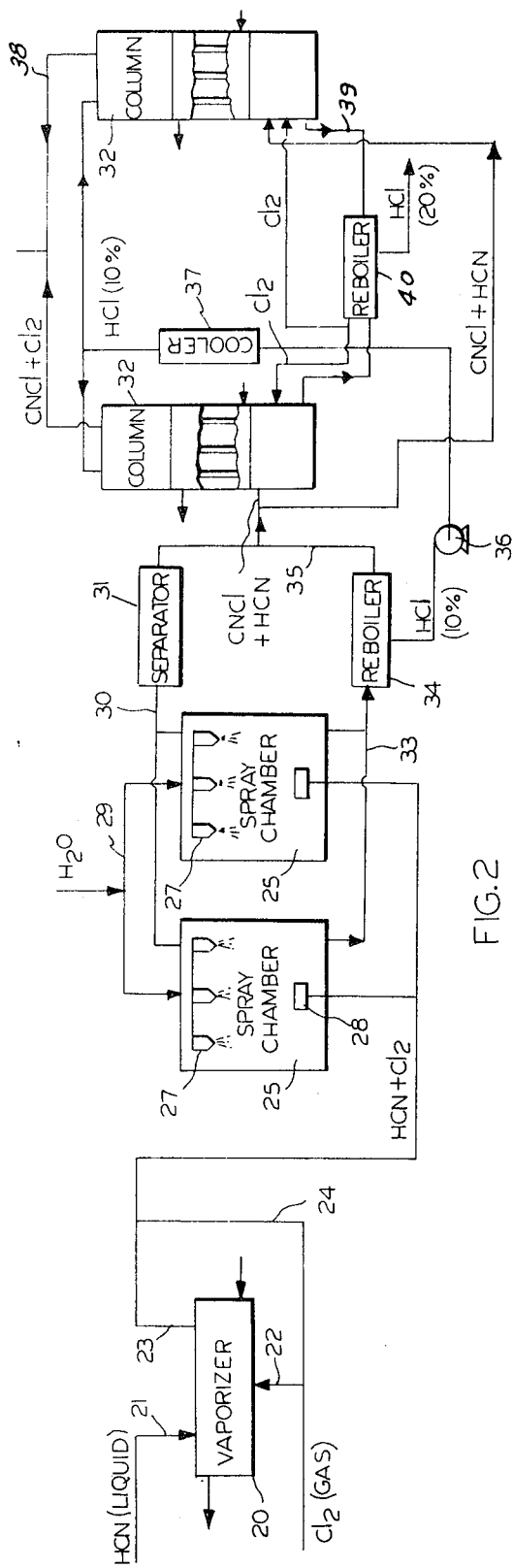
FIG. 2 is a schematic view of a practical apparatus for carrying out the method of the present invention.

A practical embodiment of the apparatus for manufacturing cyanuric chloride using the spray chamber apparatus and method described above is seen in FIG. 2. The apparatus comprises a vaporizer 20 in the form of a heat exchanger 6 feet long and having 199 tubes with a ⅞-inch diameter. Liquid HCN is fed into the vaporizer through an HCN inlet 21, and part of the chlorine is fed into the vaporizer through a chlorine inlet 22. The remainder of the chlorine is by-passed through a by-pass line 24 which joins the vapor line from the vapor outlet 23 from the vaporizer.

Two spray chambers 25 are provided, each of which is 15 feet wide and 20 feet high, and made of stoneware. Each chamber has five nozzles 26 therein which are fixed to an 8 foot diameter ring 27 placed at the center of the top of the chamber. A gas dispersion means 28 is positioned in the bottom of each chamber on the end of the HCN-chlorine feed line. A water supply pipe 29 leads to each set of water spray nozzles 27.

Each spray chamber 25 has a gas outlet near the top thereof from which a gas line 30 extends to a separator 31 for separating liquid from the gas, and from the separator 31 a line leads to each of two 30 inch diameter packed columns 32 having a heat exchanger in the middle thereof. The columns 31 each have an upper packed section 12 feet long and a lower packed section 9 feet long, both sections being packed with ½-inch saddles. The heat exchanger section is 9 feet long and has 109 1 ½ inch tubes therein. The outlet line from the separator 31 enters each of the packed columns just below the heat exchanger section.

Each spray chamber also has a liquid outlet near the bottom thereof from which the liquid line 33 leads to a reboiler 34. The reboiler is supplied with steam by lines (not shown) and heats the bottoms from the spray chambers 25 to drive off the chlorine therefrom, and a chlorine line 35 extends from the reboiler to the line between the separator 31 and the packed columns 32. An HCl line extends from the reboiler through a pump 36 and a cooler 37 and branches to the top of each of the columns 32.

A gas outlet line 38 is provided at the top of each column 32, and a bottom line 39 leads from the bottom of each column 32 to a second reboiler 40, which is also steam heated by a steam supply (not shown). The chlorine line from the second reboiler leads back into the lower packed section of each column 32, and an acid line from the bottom of the second reboiler.

It is contemplated that by feeding 1,605 lbs./hr. HCN and vaporizing it with 1,841 lbs./hr. chlorine, and by-passing about 3,445 lbs./hr. of the chlorine, and by spraying water into the spray chambers at a rate of 5,286 lbs./hr., the apparatus can produce 3,660 lbs./hr. CNCl. Under these conditions, the cooling water should enter the heat exchanger part of the columns 32 at about 25° C and leave at 28° C, and the temperature of the liquid at the bottom of the heat exchanger sections is about 50° C and at the top is about 70° C.

What is claimed is:

1. An apparatus for producing cyanogen chloride comprising a source of vaporized hydrogen cyanide mixed with gaseous chlorine, a hollow spray chamber having a gas dispersing means for conveying the mixture of hydrogen cyanide vapor and chlorine to said dispersing means from which the mixture is sprayed into said spray chamber, water nozzle means directed into said spray chamber toward the spray of the mixture, water supply means connected to said water nozzle means for supplying water under pressure to said nozzles, whereby a spray of water is directed into spray to spray contact with the spray of said mixture, a gas outlet means near the top of said spray chamber for removing cyanogen chloride and hydrochloric acid, respectively, a reaction column having a heat exchanger therein with at least one tube therein, a packed section above said heat exchanger and a packed section below said heat exchanger, a line from said gas outlet means in said spray chamber to the lower packed section of said reaction column for feeding the gaseous reaction products from said spray chamber to said reaction column, gas outlet means at the top of said column, and liquid outlet means at the bottom of said column for removing cyanogen chloride and hydrochloric acid, respectively, and a reboiler connected to the liquid outlet means of said spray chamber, said reboiler having a gas outlet means and a liquid outlet means, the gas outlet means of said reboiler being connected to said line to said lower packed section and said liquid outlet means being connected to the top of said upper packed section of said reaction column, whereby the hydrochloric acid from the bottom of said spray chamber is stripped of chlorine in the reboiler, the chlorine being fed to the lower part of the reaction column with the cyanogen chloride and unreacted hydrogen cyanide from the spray chamber and the hydrochloric acid being fed to the top of the reaction column as additional reaction medium.

* * * * *